United States Patent [19]

Perkins

[11] Patent Number: 5,168,572
[45] Date of Patent: Dec. 1, 1992

[54] SYSTEM FOR DYNAMIC SELECTION OF GLOBALLY-DETERMINED OPTIMAL DATA PATH

[75] Inventor: Arthur T. Perkins, Eatonville, Wash.

[73] Assignee: The Boeing Company, Seattle, Wash.

[21] Appl. No.: 321,614

[22] Filed: Mar. 10, 1989

[51] Int. Cl.⁵ .................. G06F 13/14; H04J 13/00
[52] U.S. Cl. .................. 395/800; 364/DIG. 1; 364/229; 364/231.9; 364/260; 364/931.01; 395/200; 370/94.1
[58] Field of Search .............. 370/94.1; 364/200; 395/800, 200

[56] References Cited

U.S. PATENT DOCUMENTS

| | | | |
|---|---|---|---|
| 3,815,095 | 6/1974 | Wester | 395/800 |
| 4,247,892 | 1/1981 | Lawrence | 395/200 |
| 4,319,321 | 3/1982 | Anastas et al. | 395/700 |
| 4,380,046 | 4/1983 | Fung | 395/800 |
| 4,466,064 | 8/1984 | Martin | 395/800 |
| 4,490,785 | 12/1984 | Strecker et al. | 395/325 |
| 4,514,807 | 4/1985 | Nogi | 395/800 |
| 4,580,215 | 4/1986 | Morton | 395/800 |
| 4,663,706 | 5/1987 | Allen et al. | 395/200 |
| 4,720,780 | 1/1988 | Dolecek | 395/800 |
| 4,814,980 | 3/1989 | Peterson et al. | 395/200 |
| 4,816,993 | 3/1989 | Takahashi et al. | 395/250 |
| 4,831,519 | 5/1989 | Morton | 395/325 |
| 4,905,233 | 2/1990 | Cain et al. | 370/94.1 |
| 4,933,930 | 6/1990 | Lien et al. | 370/18 |

Primary Examiner—Thomas C. Lee
Assistant Examiner—Krisna Lim
Attorney, Agent, or Firm—Mary Y. Redman

[57] ABSTRACT

A system for choosing a data path through a multiprocessor array on a least time and path availability basis. In a preferred embodiment, each processor has an associated path selection element. The element associated with the data source sends out a signal to adjacent elements. The signal is propagated outward through the array until it reaches the path selection element associated with the destination processor. When the signal reaches the destination element, that processor responds by outputting a response signal which is channeled back to the source element via the path selection elements associated with those processors which propagated the preferred path of the original signal, establishing a data path through these elements. Integrated circuits situated as adjuncts to each processor in the array can be fabricated as the elements which implement this system.

19 Claims, 11 Drawing Sheets

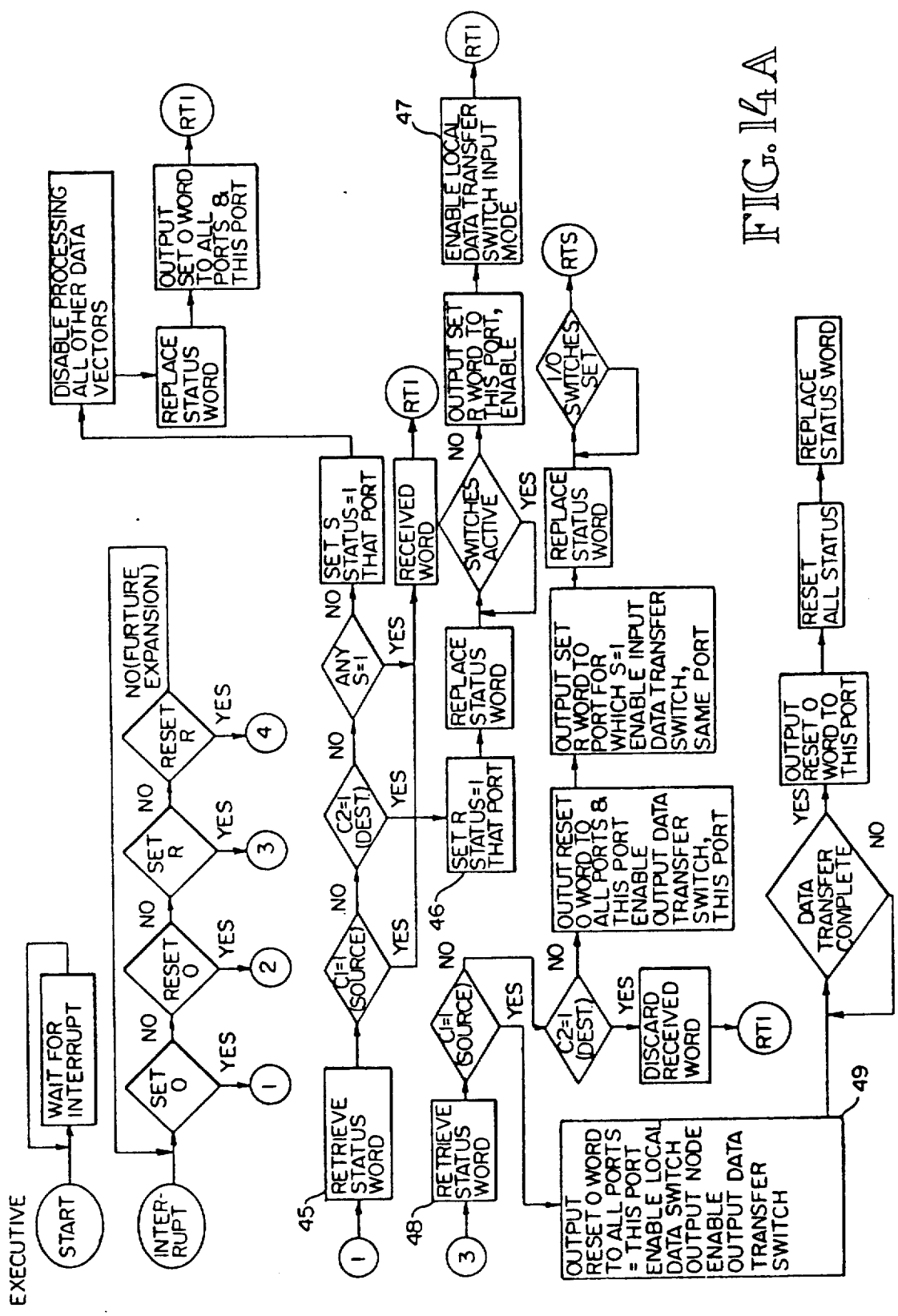

SYSTEM FOR DYNAMIC SELECTION OF GLOBALLY-DETERMINED OPTIMAL DATA PATH

BACKGROUND OF THE INVENTION

The invention relates to parallel processing arrays, and more particularly to communications among individual processing elements of a multidimensional array, such as a MIMD (multiple instruction—multiple data stream) processor array for high speed computing.

A recognized source of multiple processing system inefficiencies is the movement of data between system, or array, elements. One approach to inter-element data exchange is to use a common bus along which all system-internal data is to be transferred. While this approach has favorable characteristics such as simplicity, it suffers the disadvantage of requiring all system elements to share the same communication resource, thus forcing the elements into a sequential mode of operation. For processing arrays of appreciable size, multiple inter-element data paths must be provided. However, a multiplicity of data path introduces the additional complexity of selecting the best path for each particular transfer.

Prior art data path selection systems typically require some a priori knowledge of the topology of the array, and some are operable only for a limited range of topologies. Some require physical node identification, or require data to be clocked through intervening nodes to reach the destination node.

What is needed is a data path selection system which establishes the optimal data path on a least time basis on a global scale, and which does not require a centralized controller having knowledge of the array topology. Ideally, such a system would require neither a priori information about the configuration of the array, nor arithmetic computations. Such a system would operate independent from other array functions and would not require physical identification of destination nodes or clocking of data through intervening nodes.

SUMMARY OF THE INVENTION

The invention provides a method and apparatus which accomplishes the above-listed objectives. The invention establishes the preferred data path on the basis of globally-determined minimum time for data transmission and path availability, without requiring a priori selections, prioritized patterns, or processor computation. Because of this, the process of the invention can support flexible, time-variant task assignment, or "task-to-processor association", algorithms, for which data routing may be established on a symbolic basis without regard to the system topology or the physical identification of array elements. The increased separation between the data path select function and the task assignment and task processing functions of the system results in faster operation. The functional independence of the data path selection process of the invention results in a system in which both the task processor and the system control logic may continue to perform useful work during data path selection, yielding a net increase in system throughput. Furthermore, the complexity per node of a system utilizing the invention remains constant with the total number of system nodes. This characteristic supports a generic, fault-tolerant system structure.

The present invention involves a conceptually unique and novel system for dynamically choosing a data path through a multi-processor array of two or more dimensions on a least time and path availability basis. In a preferred embodiment of the invention each processor has associated with it a path selection element, described in detail below. The method of the claimed invention, in one embodiment, includes sending out a signal from the path selection element of a data source to each adjacent element. The signal is then propagated outward through the array until it reaches the path selection element associated with the destination processor. During this propagation, each element responds only to the first incoming signal. When the signal reaches the destination element, that processor responds by outputting a response signal which is channeled back to the source element via those processors which propagated the preferred path of the original signal, establishing a data path through these elements while cancelling out the source signal. This channeling is accomplished by applying the rule that the response signal be output by an element at the specific port at which the original source signal was sensed. Conceptually, the process may be viewed as being similar to an outwardly expanding wavefront and reflected wave.

In the embodiment described above, the source element and the destination element may be predetermined. For example, a central controller may identify the source and destination and inform each of its respective status. The invention can also be used in a system in which the source and destination elements are not physically identified, but instead where the data routing is symbolically established. In this case, the outgoing signals are encoded in such a way that a suitable destination element (i.e., an element which is able and available to perform the prescribed task) will respond as did the destination element in the first described embodiment. There is no need for a specialized type of processor to implement the invention; it can be implemented on arrays containing any variety of commercially available processors. The path-selection logic is generic and standardizable; the hardware necessary to implement the data path selection system can be inexpensively fabricated as integrated circuits which are situated as adjuncts to each processor in the array.

BRIEF DESCRIPTION OF THE DRAWINGS

FIGS. 14a and 14b are a flow-chart of a path selection logic control algorithm which may be used in the embodiment of FIG. 10;

DETAILED DESCRIPTION OF A PREFERRED EMBODIMENT

Figure 1:
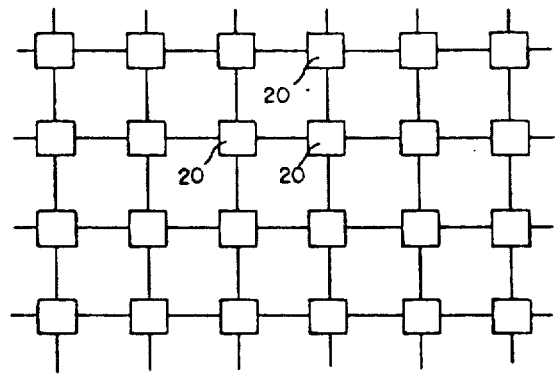
FIG. 1 is a schematic representation of a two-dimensional processor array.

The invention will be described with reference to a two dimensional processor array for ease of illustration, but it will be understood that the invention can be practiced with processor arrays of any number of dimensions. FIG. 1 schematically shows a two-dimensional array of path selection elements 20, wherein each path selection element may have an associated processor element 21. The processor elements 21 within the array can include any type of commercially available processor, such as microprocessors, pc's, mainframes, etc., in an arbitrary mix of types and suitably modified in a manner described below. Each path selection element 20 in the array has several ports through which it can communicate with adjacent elements. In the illustrated two dimensional array, each path selection element has four ports. The number of ports on each element will be greater for arrays of more than two dimensions.

Figure 2:
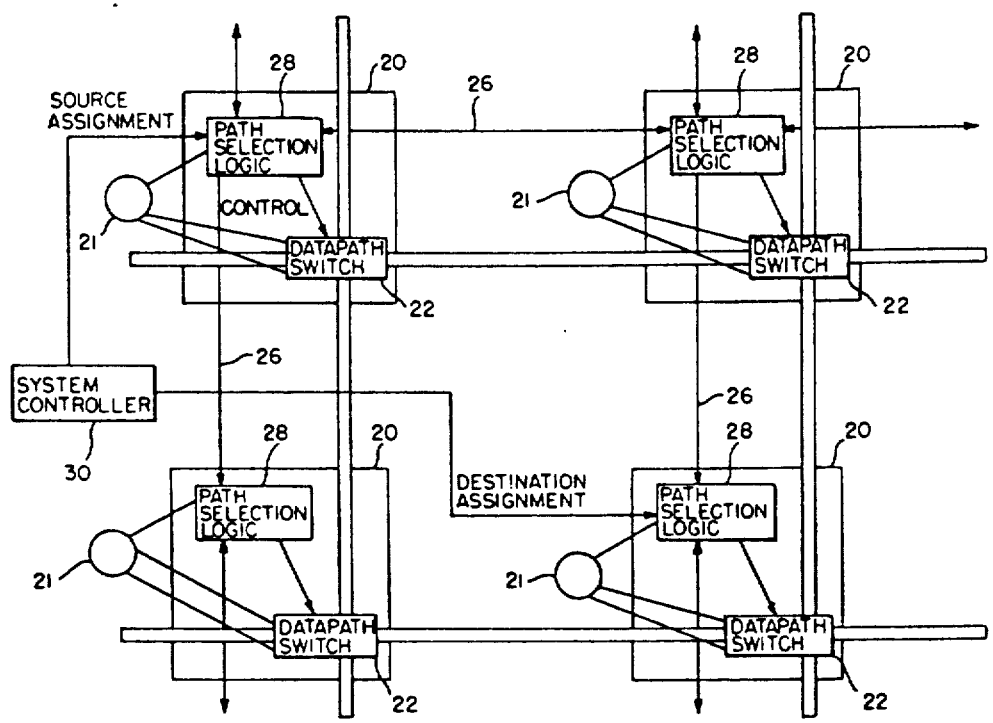
FIG. 2 is a schematic representation of a processor array showing certain elements used in the data path selection process.

As shown in FIG. 2, the path selection elements 20 in a preferred embodiment are each associated with a local processor 21. The path selection elements 20 include data path switches 22 and path selection logic units 28 which control the switches. Data path lines or links 24 connect the data path switches of adjacent elements 20, and path selection communication lines or links 26 run parallel to the data path links 24, connecting the path selection logic units 28 of adjacent path selection elements 20. The path selection communication links 26 and path selection logic units 28 will be described in detail below.

The need to select a data path arises when one particular processor will act as a data source while another will act as the destination processor, i.e., that processor which will accept the data from the source and perform the desired process on the data. The source and destination may be chosen by a central array controller 30, which is in communication with all elements 20 in the array, before the data path selection process begins, or both source and destination processors may determine themselves to be acting in these roles. The identity of the destination processor in such case may not be yet determined at the outset of the path selection process. Certain other processors in the array may be unavailable to participate in data transfer if they are occupied with other tasks or otherwise disabled.

To give the reader a clear understanding of the invention, a generalized overview of the data path selection system will first be given, followed by more detailed exposition of the preferred embodiments.

Figure 3:
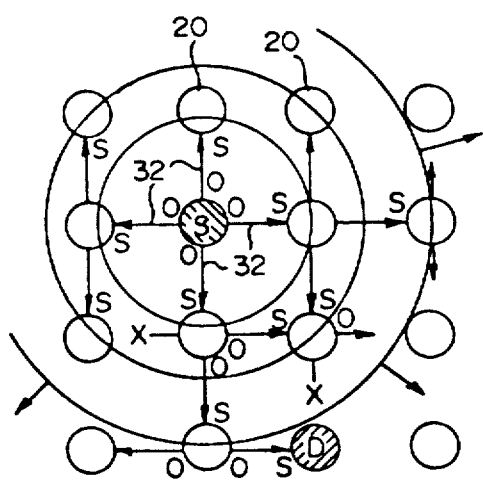
FIGS. 3, 4, 5 and 6 are sequential schematic representations of a data path selection process according to one embodiment of the invention.

A generalized functional overview of the data path selection method of a preferred embodiment is illustrated in FIGS. 3 through 6. As FIG. 3 shows, the data source element S outputs signals to the adjacent elements. These source signals are preferably in the form of active states on the path selection communication links 26. These signals act like "feelers", seeking out an appropriate destination element. They are propagated outward through the array by the elements which receive them. Each element responds only to the first received source signal. Some elements will be unable to transfer data, and these, too, will not respond to incoming signals. Signals which are not responded to are indicated by an "X" in FIG. 3. This process can be thought of as being conceptually similar to an outwardly propagating wavefront.

Figure 4:
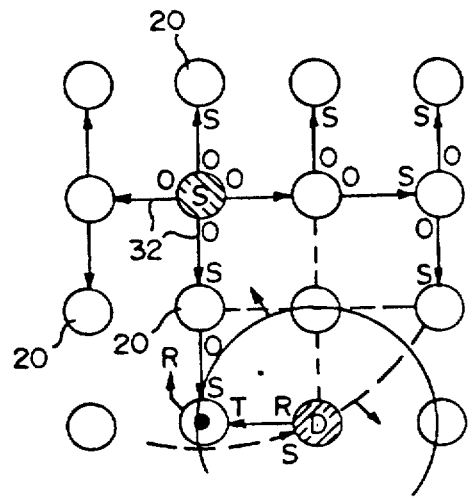

Successive elements propagate the source signal until it reaches the destination processor D. Referring now to FIG. 4, when a source signal 32 arrives at the destination element D, that node responds by outputting a response signal 34. The same elements which propagated the original source signal 32 to the destination node D now channel the response signal back to the data source element S. This is accomplished by each element outputting the response signal through the same port at which the original source signal was received. In addition to propagating the response signal, each intermediate element cancels the source signals which were output for ports other than those involved in response signal propagation. This cancels the "feeler" field locally, (as indicated by dashed lines) and the cancellation propagates outward through the array until only those ports which will be in the data path will remain active. This process is conceptually similar to the "source wavefront" of FIG. 3 reaching the destination node D, triggering a response signal which propagates like a reflected wavefront. This reflected wavefront triggers the collapse of the source wavefront and establishes a datapath connection.

Figure 5:
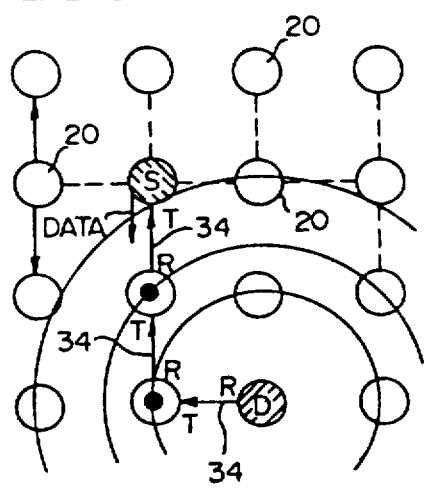
Figure 6:
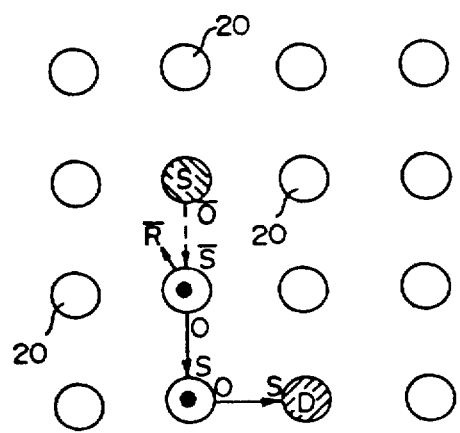

Referring now to FIG. 5, when the response signal 34 reaches the source element S, the associated source processor responds by outputting data through its data path selection element S on data path links along the path established in the previous steps. This is conceptually similar to the reflected wavefront reaching the source element S and initiating source-to-destination data transfer along the established path. Referring to FIG. 6, when data transmission is complete, the data source element S sets its source signal output port back to the inactive state. This cancellation (indicated by dashed lines) propagates back via the source-to-destination path, with each intervening element canceling all source and response signals, and opening the associated data path switches that had allowed data transmission along the associated data path links. The process terminates when the destination element D senses the cancellation of the source signal.

Figure 7:
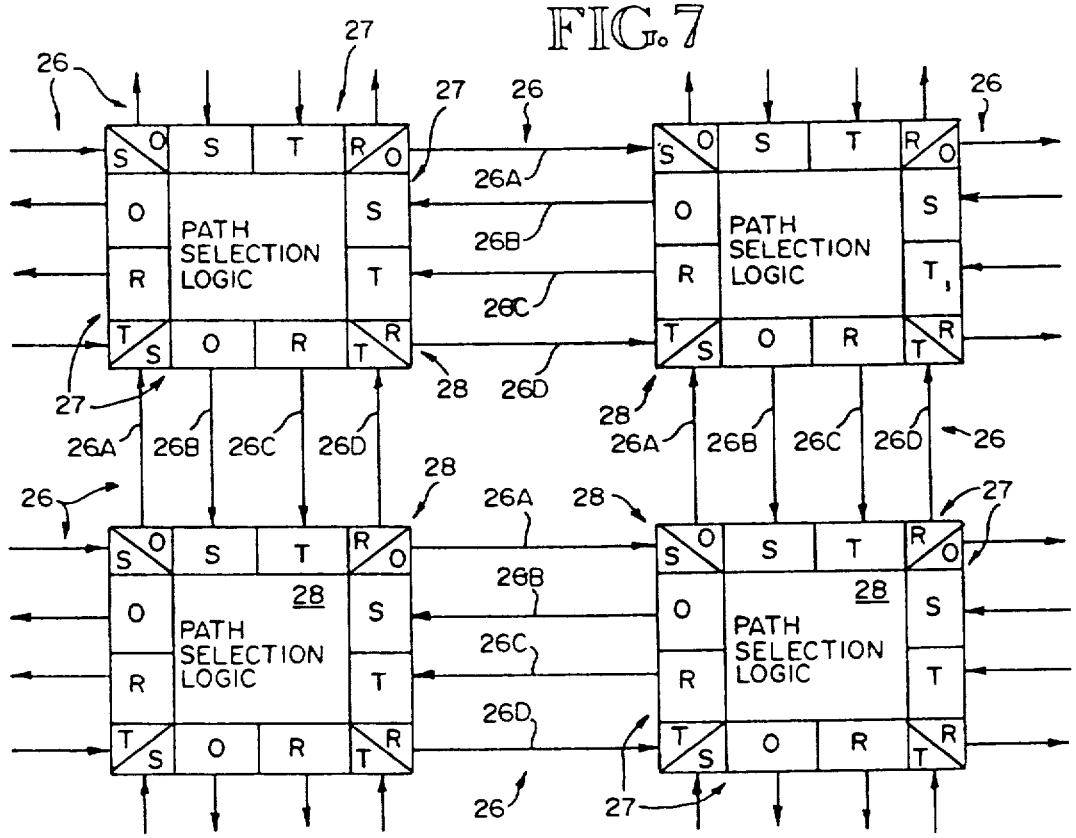
FIG. 7 is a schematic representation of path selection logic units communication links in a first embodiment of the invention.

The operating principles of the data path selection process of the claimed invention will now be discussed in detail. A first embodiment of the invention is suitable for use in a system which includes a central controller 30 (shown in FIG. 2) in communication with all array elements 20, which identifies one data source and one destination at a time. Using a separate system data bus (not shown), the controller 30 notifies both the source processor path selection element S and the destination processor path selection element D of their active status, after which the data path selection process begins. Referring to FIG. 7, each path selection communication link 26 of this first embodiment is composed of four signal lines 26A, 26B, 26C, 26D associated with each port 27 of an element 20. These lines provide an interface among logic devices within the path selection logic units 28 of adjacent processor elements and are functionally designated as follows:

S = Sensed Source signal
O = Output Source signal
R = Output Response signal
T = Sensed Response signal In operation, source and destination processors are designated by the system controller 30. To initiate a data transfer, the associated source element outputs source signals in all directions, i.e., from all ports, by setting its O signal active. The O signal from one element is connected by a signal line to the S input of the adjacent element, which will in turn be switched to the active state. When an S input of an adjacent element is sensed to be in the active state, that element responds by setting its own O signals active on all ports except that port on which S was sensed active. Also, the sensing of all S inputs except the first sensed (or an arbitrarily selected highest priority port for simultaneously sensed inputs) is disabled.

When an S input is sensed to be active at the destination processor, its O remain set inactive. Instead, the appropriate R signal is set active. The appropriate R signal is the one associated with that port whose S input was first sensed active (or an arbitrarily selected highest priority port for simultaneously sensed inputs).

The R signal from one element is connected to the T input of the adjacent element. When a T input is sensed active, the element responds by setting inactive all O signals except for the port for which T is sensed active and by setting the R signal active only for that port for which S is sensed active. In addition, the path selection logic unit commands the data transfer switch for that element to establish a data path from the port for which T is sensed active. R (and O) signals that are set active for each element will remain active only if the S (and T) inputs for the associated port remain active.

When T is sensed active on a port of the source processor, its other O signals are reset inactive (as was done in other elements) and the path selection logic unit 28 instructs the data path switch to execute a data transfer on the data path link at the port for which the T input is sensed as active. Following the data transfer, the active O signal on the source processor is reset to the inactive state. This reset propagates throughout the system, opening element data switches and terminating the data path selection process.

Figure 8:
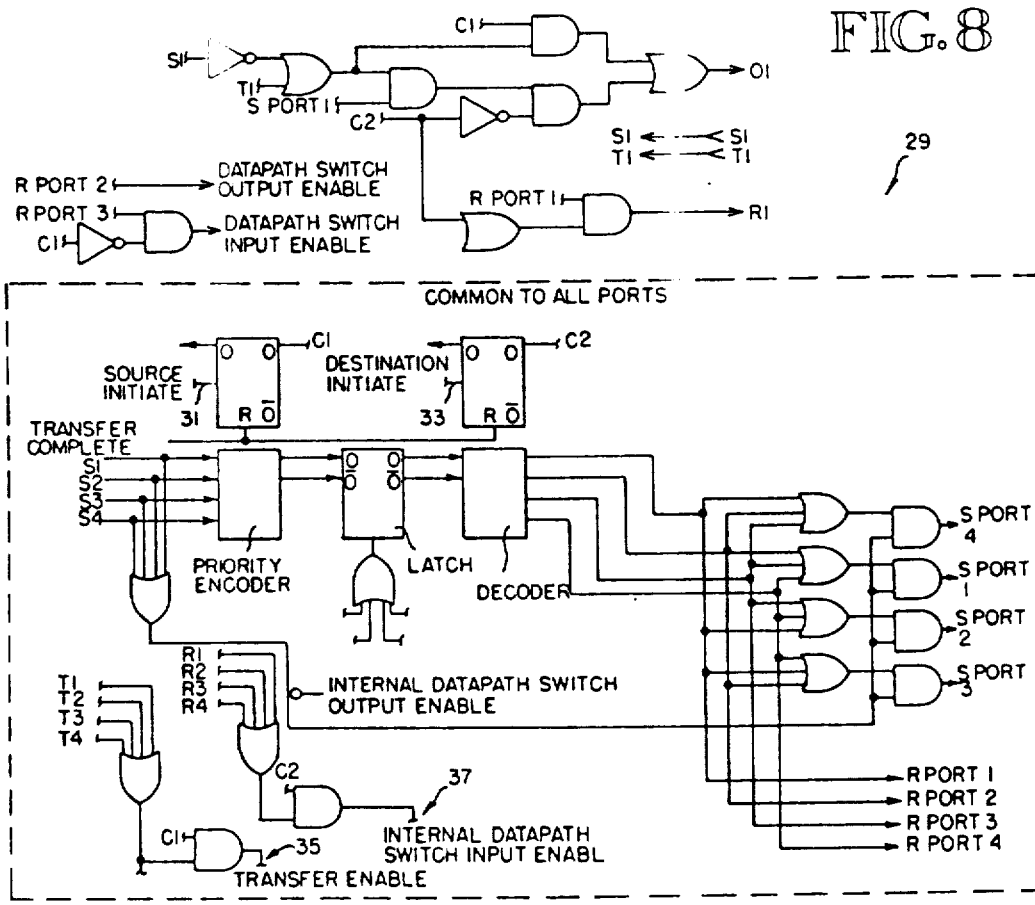
FIG. 8 is a circuit diagram for a path selection logic port in the embodiment of FIG. 7.
Figure 9:
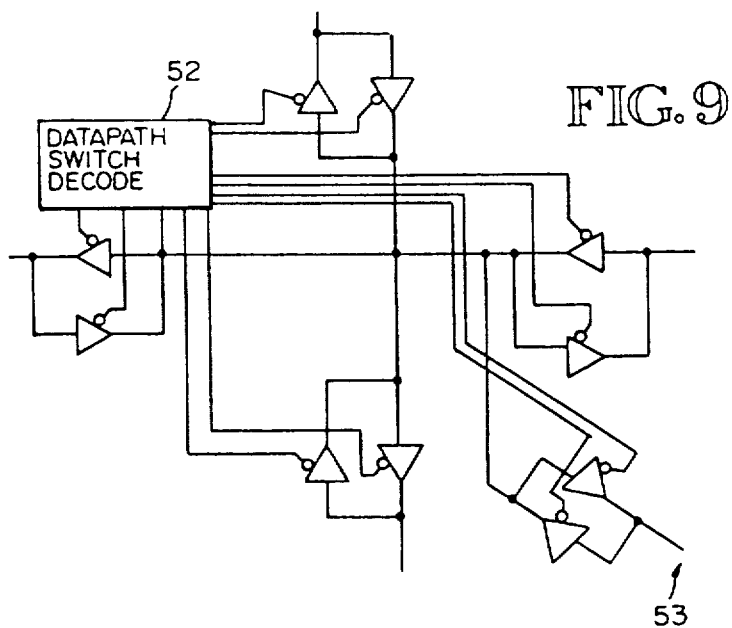
FIG. 9 is a diagram of the data path switch network in the embodiment of FIG. 7.

Referring to FIG. 8, the data path selection and path selection logic control signals to the data path switch network can be implemented by logic circuitry 29 for each transmission direction on each port. This figure shows circuitry appropriate for a four port element. Communication between the circuit 29 and the node local processor occurs at the source initiation input 31 and the destination initiation input 33, and at the transfer enable output 35 and internal datapath switch input connection 37. The datapath switch network is illustrated in FIG. 9. These circuits can be inexpensively fabricated and added on to commercially available processors to adapt them for use with the claimed invention.

Figure 10:
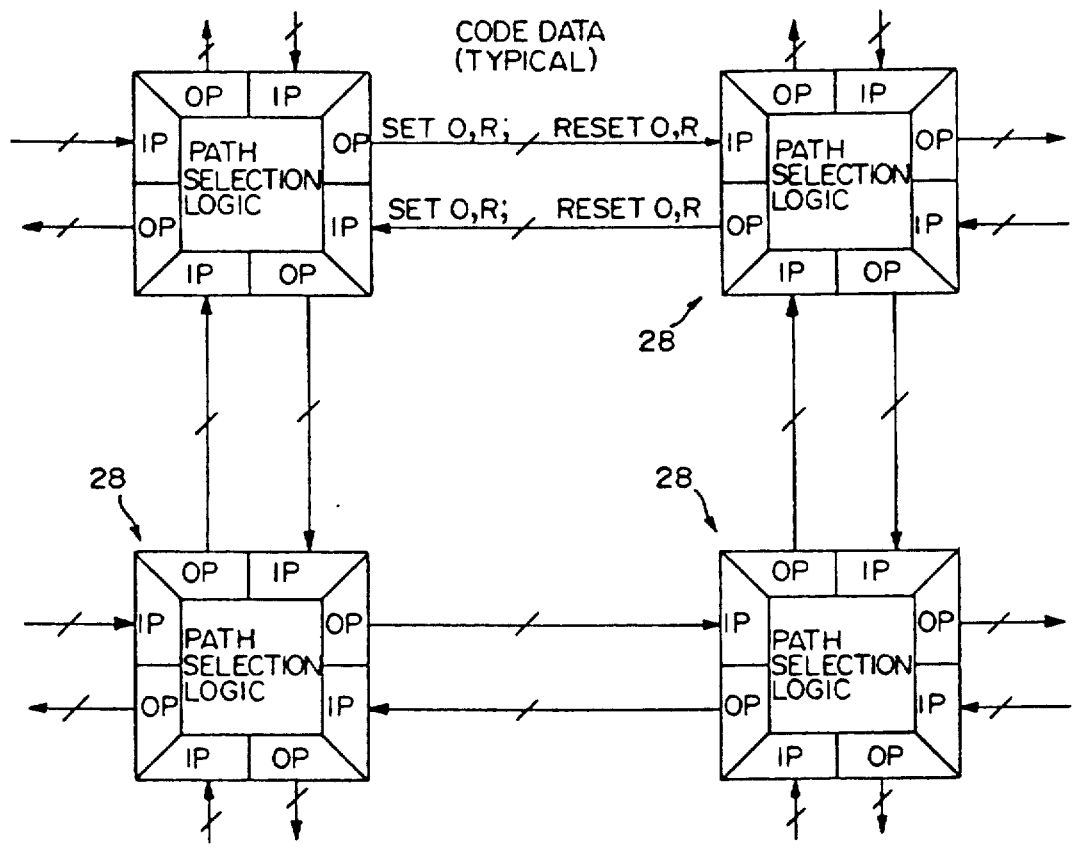
FIG. 10 is a schematic representation of path selection logic units communication links in a second embodiment of the invention.
Figure 11:
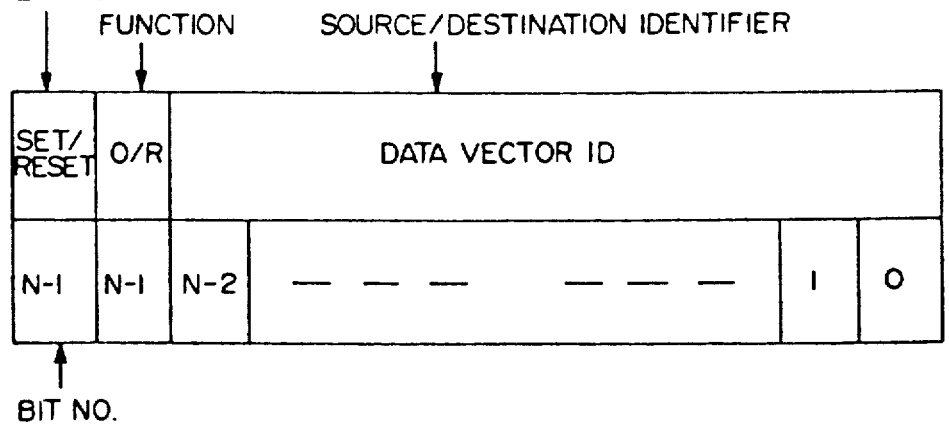
FIG. 11 is a diagram of a word format used in the embodiment of FIG. 10.

Referring now to FIG. 10, in a second embodiment of the invention, rather than devoting a separate control line to each path selection logic function, the functions are encoded as bit patterns for inter-element transmission. This embodiment will therefore be referred to as the "coded" embodiment (and the previously described embodiment as "uncoded"). The purpose of encoding the path selection logic signals is to treat the associated data as a vector having specific source and destination task coordinates. Source and destination data is included with the control information, as shown in FIG. 11, so that the coded data path selection process need not rely on a central controller to synchronize data transfers or to select source and destination elements. Instead, the path selection process may be initiated by any element operating as a local data source. Simultaneous activity of multiple path selection processes within an array is possible.

Because of the undedicated nature of the control lines in the coded embodiment, the path selection logic unit interface on each element, consists simply of an output signal interface (labeled OP) and an input signal interface (labeled IP) to provide bidirectional communication between elements. Each of these signal interfaces may consist of multiple lines for bit-parallel transmission, or a single line as shown for bit-serial transmission. Equivalence of the path selection logic unit interfaces of the first embodiment and received or transmitted bit codes of the second embodiments is given on the table below:

| UNCODED | CODED |
|---------|-------|
| S | Received O |
| O | Transmitted O |
| R | Transmitted R |
| T | Received R |

Because the encoded data are mutually exclusive, the control information must be latched at the receiving element. For this purpose, the path selection logic control notation includes "set" and "reset" operations as well as the O and R functions, as noted below:

| Control CODE | Operation | Function |
|---|---|---|
| 00 | Reset | O |
| 01 | Reset | R |
| 10 | Set | O |
| 11 | Set | R |

Figure 14B:
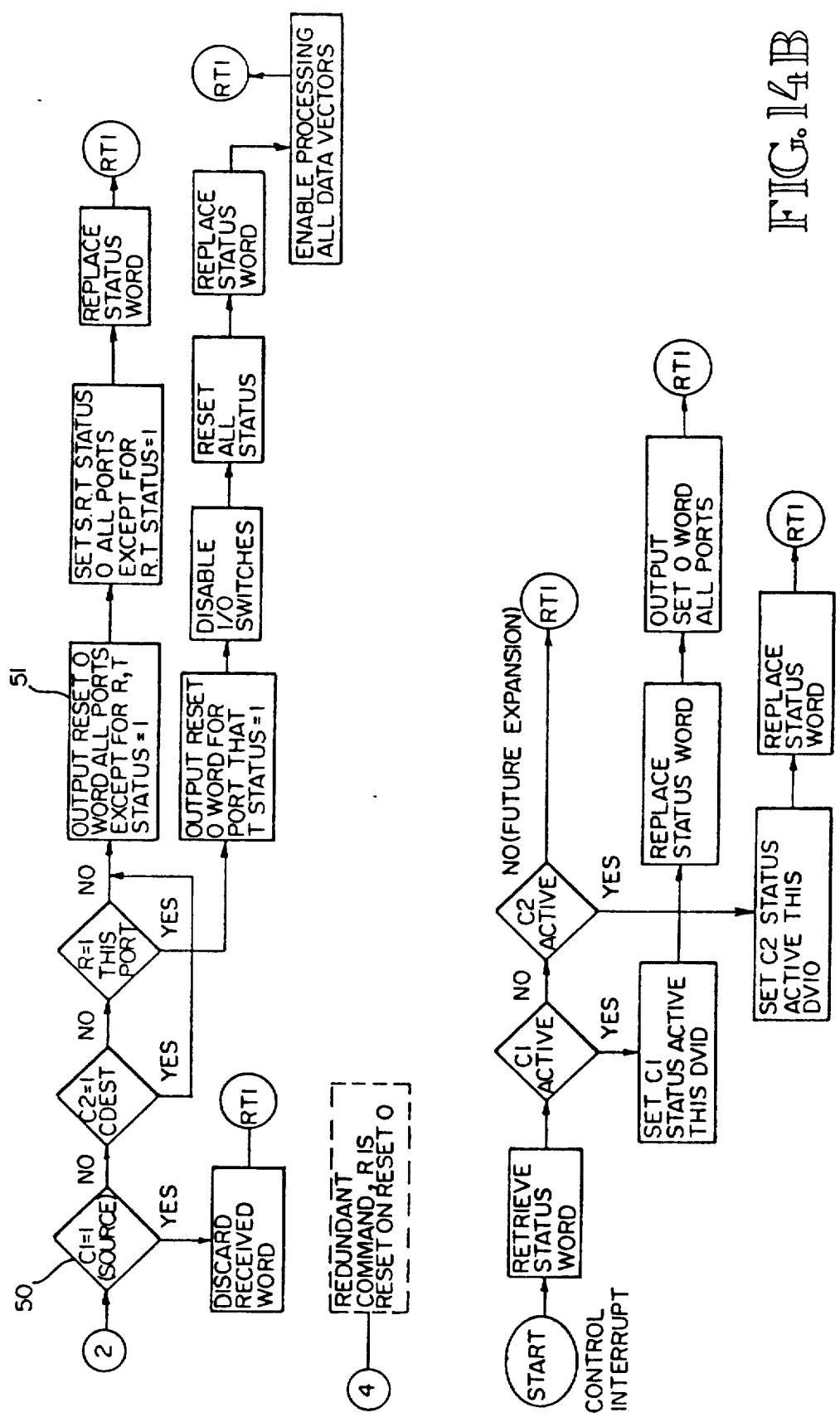
Figure 15:
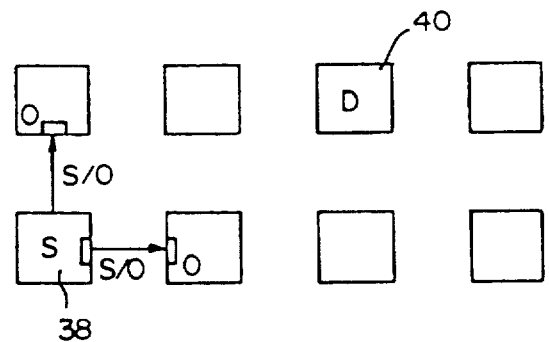
FIGS. 15, 16, 17, 18, 19, 20, 21, 22, 23, 24, 25, and 26 are sequential schematic diagrams of the process of the FIG. 10 embodiment.
Figure 16:
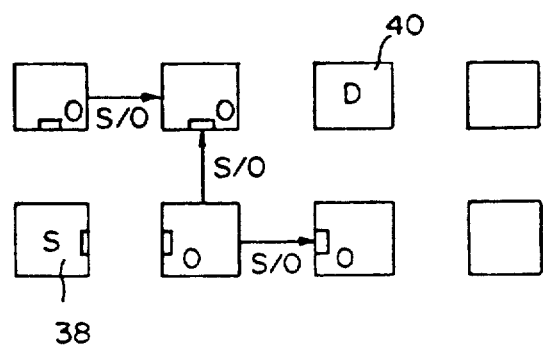

Referring to FIG. 15, in operation, the source element 38 sends output signals in all directions in the form of a "set/O" word with associated data vector identification, as shown in FIG. 11. An element that receives a "set/O" word interprets this as an "S active" condition (as in the uncoded case) and responds as shown in FIG. 16 (and in the procedure beginning with block 45 in FIG. 14A) by transmitting a "set/O" word with the same data vector identifier on all ports except that port on which the "set/O" word was originally received (indicated by reference letter O). Only the first sensed "set/O" word of a given data vector, or arbitrarily assigned highest priority in the case of simultaneously received words, is acted upon. At this time, the element will also inhibit operation on any path selection logic signals with other data vector identification. For purposes of illustration in FIGS. 15-26, the arbitrarily assigned priority is highest for the port facing the top of the drawing, and decreases in a clockwise direction.

Figure 17:
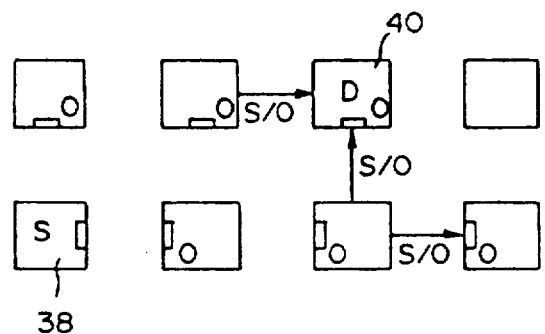
Figure 18:
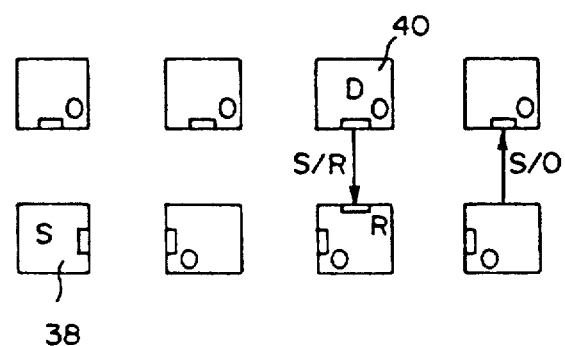

Referring to FIG. 17, when a "set/O" word is received at the destination element 40 no new "set/O" commands are generated; instead, as shown in FIG. 18, the appropriate (for first received "set/O" or highest priority) "set/R" word is generated with the same data vector identification and transmitted on the same output port where the "set/O" word was received (see blocks 46 to 47, FIG. 14A.

Figure 19:
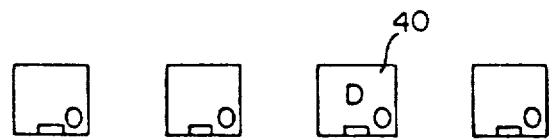
Figure 20:
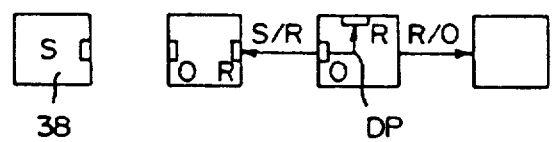

An element that receives the "set/R" word interprets this as a "T active" condition (as in the uncoded case) and responds as shown in FIG. 19 (and in the procedure beginning with block 48 in FIG. 14A) by issuing a "reset/O" word at all ports except for the port that received the "set/R" word, and by issuing a "set/R" word only for the port for which an "S active" condition was established. As a result of this action, the data transfer switch for that element opens (see block 49, FIG. 14A) to establish a data path from the "S active" port to the "T active" port as indicated generally by reference arrow "DP" in FIG. 20.

Figure 21:
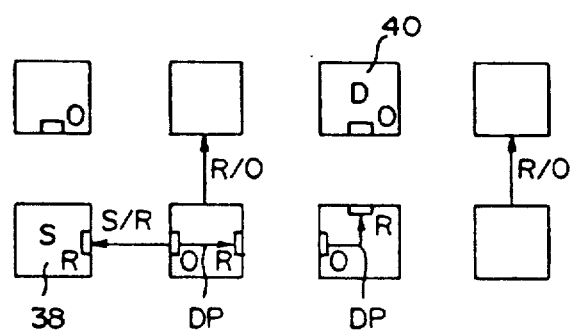

Referring to FIG. 21 (and to the procedure beginning with block 50 in FIG. 14B), an element that receives a "reset/O" word at any port other than that for which a "set/R" word was output will set the receiving port back to the inactive state and repeat the "reset/O" word to all ports except those for which a "set/R" word was input or output (see block 51, FIG. 14B). An element that receives a "reset/O" word at the port for which a "set/R" word was output will output a "reset/O" word at the port where a "set/R" word was received, and internally reset its R output. Any element for which the 0 and R states return internally inactive will reenable the processing of path selection data, allowing that processor element to participate in other path selection processes.

Figure 22:
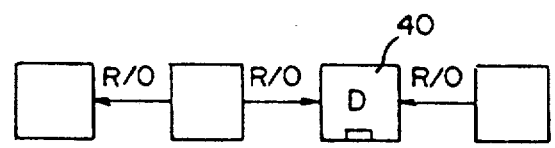
Figure 23:
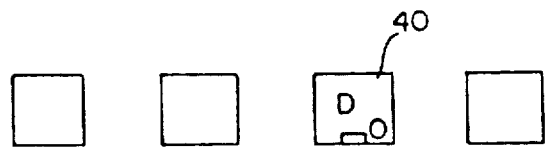
Figure 24:
Figure 25:
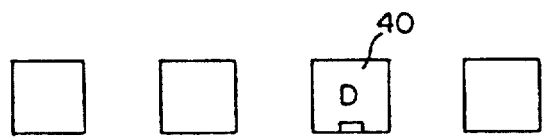
Figure 26:
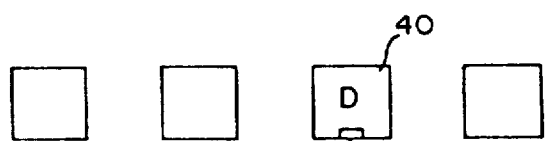

Referring to FIG. 22, when a "T active" state exists on a port of the source processor, a "reset/O" word is issued from all other ports, and the source node 38 executes a data transfer ("DT") on the "T active" port. Following the data transfer, a "reset/O" word is issued from that port as shown in FIG. 23. The interfacing element receives the "reset/O" word at the connecting port which is in its "S active" state, causing a state change to "S inactive" for that element and a propagation of the data transfer and the "reset/O" word to the next element in the data path chain (see FIGS. 24 to 26). Upon transmission of the "reset/O" word back to the destination node 40, all elements will have returned to the inactive state, completing the data transmission cycle. The disabling and reenabling conditions described above for path selection logic processing may be modified to be less restrictive for processor arrays which are designed to permit multiple simultaneous data transfers.

Figure 13:
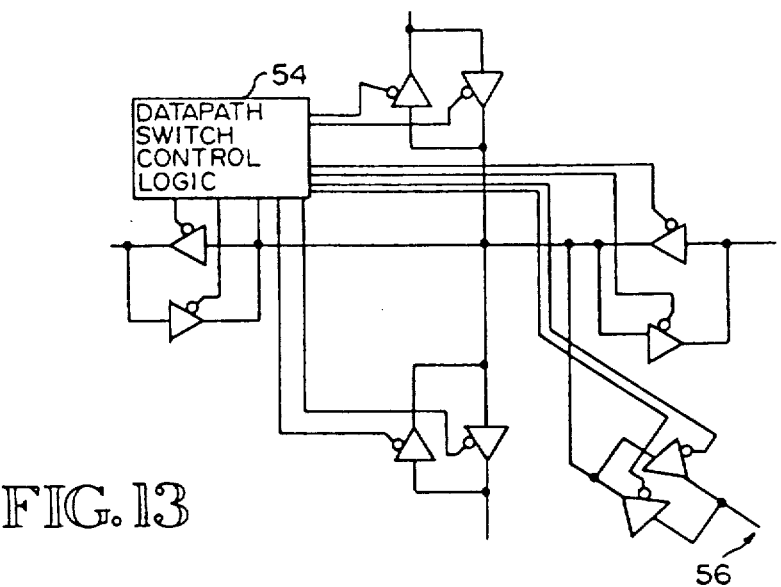
FIG. 13 is a diagram of the data path switch network in the embodiment of FIG. 10.
Figure 12:
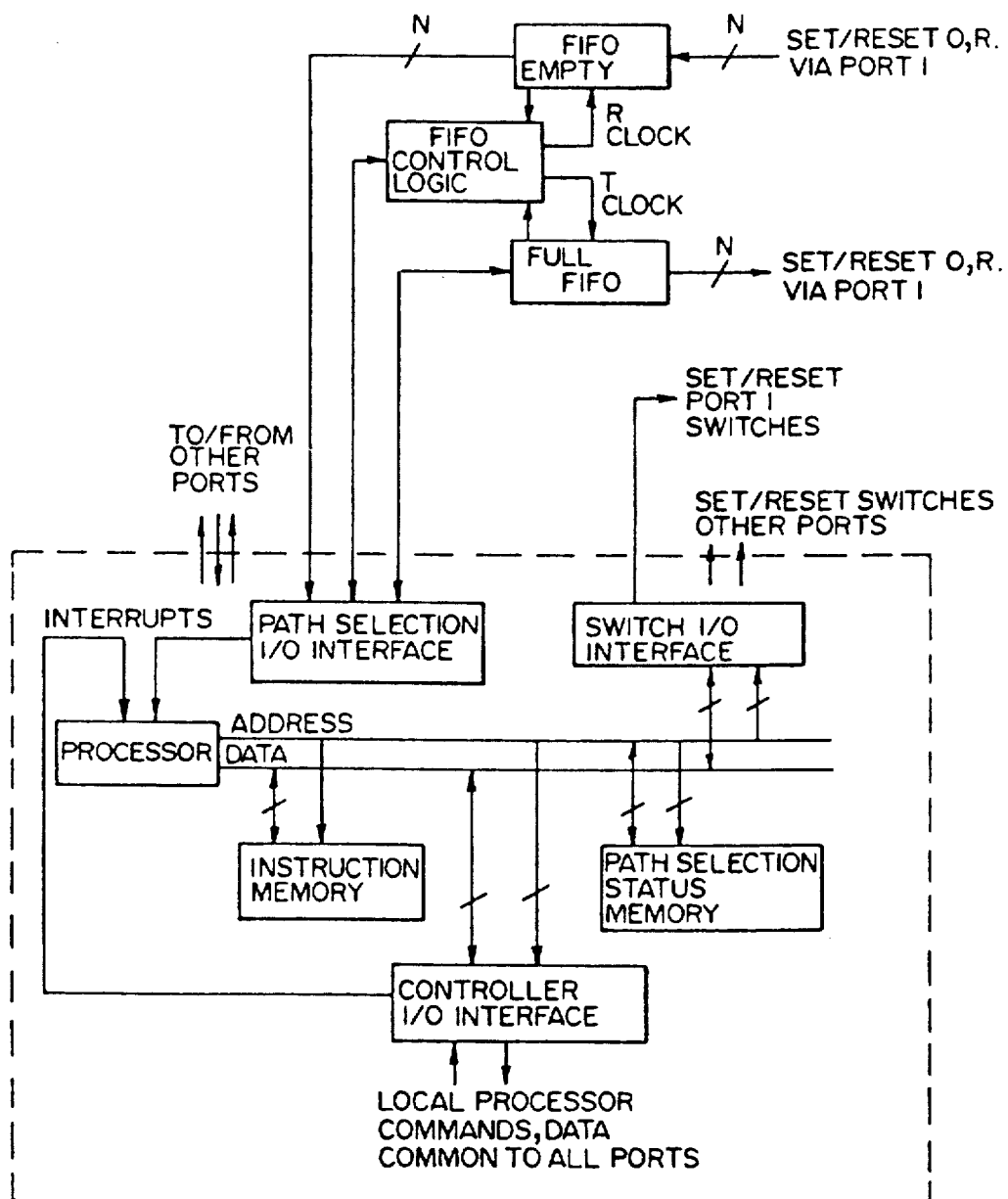
FIG. 12 is a circuit diagram for a path selection logic port in the embodiment of FIG. 10.

The coded embodiment of the data path selection system of the invention may be implemented by path selection logic circuitry for each transmission direction on each port, as shown in FIG. 12. A preferred datapath switch for this embodiment is shown in FIG. 13. These circuits can be inexpensively fabricated and added on to commercially available processors.

Because the coded embodiment of the invention is operable in a system without a centralized control which would limit source and destination elements to single entities at any one time, the system may be adapted to accommodate a multiplicity of simultaneously ongoing path selection processes. A microprocessor implementation of the path selection logic may be employed for such multiple path selection systems. The path selection function may be integrated with memory management and task allocation; if such is the case, a path selection logic processor could serve multiple purposes.

A path selection logic algorithm illustrating this approach is shown in the flow chart of FIG. 14. To clearly illustrate the basic process, the flow chart shows an algorithm providing a basic accommodation to simultaneous path selection processes and signals. It will be understood by those of ordinary skill in this art that the algorithm could be modified to permit one element to handle two datapaths on separate ports. The number of simultaneous data paths per element may be increased beyond two by adding ports. It will also be appreciated by those skilled in the art that the path selection algorithm may be implemented by applications-specific logic rather than a microprocessor to increase the path selection speed.

Although the invention has been disclosed with respect to a preferred embodiment, those skilled in the art will recognize that other embodiments of the invention may be configured without departing from the spirit of the invention which embodiments remain within the scope of the invention. Therefore, the scope of the present invention is to be limited only by the appended claims.

What is claimed is:

1. A method for choosing a path, along which to transfer data through an array of processors from a source processor within said array to a destination processor within said array, each of the processors within the array being adapted for two way communication with adjacent processors, comprising the steps of:
   outputting a source signal from said source processor to each of said processors adjacent thereto;
   when a processor receives said source signal, propagating said source signal from said receiving processor to each of said processors adjacent thereto until said source signal reaches said destination processor;
   when said source signal reaches said destination processor, outputting from said destination processor a response signal to that one of said processor elements from which said source signal was received;
   when a processor receives said response signal, propagating said response signal from said receiving processor to that one of said processor elements from which said source signal was received until the source processor receives said response signal; and
   transmitting data from the source processor to the destination processor along the path established by the response signal.

2. The method of claim 1 further comprising the step of preventing propagation of said source signal from any of said processors which receive said source signal and are presently unavailable to transmit data.

3. The method of claim 1 further comprising the step of halting further propagation of said source signal after said destination processor has received said source signal.

4. The method of claim 3 wherein the step of halting further propagation of said source signal includes:
   using the response signal to initiate cancellation of the source signal by interpreting the response signal as a source signal cancellation instruction at each of said processors that receives the response signal; and
   propagating said cancellation instruction from each of said processors receiving said cancellation instruction to each of said processor adjacent thereto.

5. The method of claim 1 further comprising the steps of:
   providing in said source signal a signal portion which indicates the destination processor before outputting said source signal; and
   checking said signal portion at each processor which receives said source signal to ascertain if that processor is said destination processor.

6. The method of claim 5 wherein said source and response signals are distinguished by the inclusion of signal type indicators and qualifiers with said source and response signals.

7. The method of claim 1 further comprising the initial steps of:
   choosing the source processor and the destination processor; and
   notifying said source processor and said destination processor of their respective statuses as source and destination.

8. The method of claim 7 wherein said source and response signals are distinguished by their being transmitted on separate signal lines between said processors.

9. The method of claim 7 wherein said source and response signals are distinguished by their being transmitted by functional encoding of the signal lines.

10. The method of claim 1 further including the step of configuring multiple adjacent processors for data transmission therebetween in response to the propagation of said response signal therebetween.

11. An apparatus for choosing a path along which to transfer data through an array of processors from a source processor to a destination processor, each of the processors within the array being adapted for two way communication with adjacent processors, comprising:
   means for outputting a source signal from said source processor to each of said processors adjacent thereto;
   means at each processor and responsive to said source signal for propagating said source signal from each of said processors which receive said source signal to each of said processors adjacent thereto;
   means at said destination processor and responsive to said source signal for outputting from said destination processor a signal to that one of said processor elements from which said source signal was received;
   means at each processor for propagating said response signal from said receiving processor to that one of said processor elements from which said source signal was received until the source processor receives said response signal; and
   means at each processor for transmitting data from the source processor to the destination processor along the path established by the response signal.

12. The apparatus of claim 11 further comprising means at each processor for preventing propagation of said source signal from any of said processors which receive said source signal and are presently unavailable to transmit data.

13. The apparatus of claim 11 further comprising means at each processor for halting further propagation of said source signal after said destination processor has received said source signal.

14. The apparatus of claim 13 wherein the means for halting further propagation of said source signal includes:
   means for initiating cancellation of the source signal, said initiating means being responsive to said response signal by causing said response signal to be interpreted as a source signal cancellation instruction at each of said processors that receives the response signal; and
   means for propagating said cancellation instruction from each of said processors receiving said cancellation instruction to each of said processor adjacent thereto.

15. The apparatus of claim 11 further comprising:
   means at said source processor for providing in said source signal a signal portion which indicates the destination processor before outputting said source signal; and
   means for checking said signal portion at each processor which receives said source signal to ascertain if that processor is said destination processor.

16. The apparatus of claim 11 further comprising:
   a central array controller means for choosing the source processor and the destination processor; and
   means responsive to said controller means for notifying said source processor and said destination processor of their respective statuses as source and destination.

17. The apparatus of claim 16 wherein said means for outputting a source signal and a response signal includes a signal line between adjacent pairs of said processors over which only said source signal is transmitted, and a second signal line between adjacent pairs of said processors over which only said response signal is transmitted.

18. The apparatus of claim 17 wherein said source and response signal lines are distinguished by their being functionally encoded by the processor which outputs signals on said lines.

19. The apparatus of claim 11 further including means for configuring multiple adjacent processors for data transmission therebetween in response to the propagation of said response signal therebetween.

* * * * *